United States Patent [19]

Hariton et al.

[11] Patent Number: 4,845,466

[45] Date of Patent: Jul. 4, 1989

[54] SYSTEM FOR HIGH SPEED DIGITAL TRANSMISSION IN REPETITIVE NOISE ENVIRONMENT

[75] Inventors: Dan I. Hariton, Pinole; Prasanna M. Shah, Sunnyvale, both of Calif.

[73] Assignee: Signetics Corporation, Sunnyvale, Calif.

[21] Appl. No.: 86,443

[22] Filed: Aug. 17, 1987

[51] Int. Cl.[4] .......................................... H04M 11/04
[52] U.S. Cl. .................................. 340/310 R; 371/64
[58] Field of Search ...................... 340/310 R, 310 A; 371/64; 375/58; 307/2

[56] References Cited

U.S. PATENT DOCUMENTS

| 4,556,864 | 12/1985 | Roy | 340/310 A |
| 4,583,232 | 4/1986 | Howell | 375/8 |

FOREIGN PATENT DOCUMENTS

| 57-93739 | 6/1982 | Japan . |
| 57-15584 | 9/1982 | Japan . |
| 57-141145 | 9/1982 | Japan . |
| 58-77334 | 5/1983 | Japan . |

OTHER PUBLICATIONS

Intrabuilding Data Transmission Using Power-Line Wiring, R. A. Piety; Hewlett-Packard Journal, May 1987.

Low Cost Modem IC Plugs into Power Lines, ignores Noise; Hariton et al; Electronic Design, 10/2/86.
NE5050 Power Line Modem, Specification, Signetics Corp., Sunnyvale, CA, 1987.

Primary Examiner—Joseph A. Orsino
Assistant Examiner—Jeffery A. Hofsass
Attorney, Agent, or Firm—Thomas A. Briody; Jack E. Haken; Jack D. Slobod

[57] ABSTRACT

A transceiver system for high speed, low bit-error rate data communications over a.c. power lines in the presence of repetitive impulse noise includes an a.c. power line coupling network, a power line communications modem, and a microprocessor with a memory and a programmed avoidance algorithm. The a.c. line coupling network includes a zero crossing circuit to detect the start of each a.c. cycle; a transient-voltage limiting front end to detect impluse noises above a threshold and minimize ringing, and a timing circuit to determine the time and duration of each impulse in each sampled a.c. cycle. The microprocessor records the start and stop times of impulses, repetitively scans several a.c. cycles and determines whether or not the impulses are periodic. For periodic impulses, the microprocessor blocks communication on the modem during the impulses, enabling the transceiver to transmit and receive between impulses.

11 Claims, 6 Drawing Sheets ns with
imprecise noise detection circuits tend to reduce data
SYSTEM FOR HIGH SPEED DIGITAL TRANSMISSION IN REPETITIVE NOISE ENVIRONMENT

BACKGROUND OF THE INVENTION

1. Field of the Invention

This invention pertains to the transmission of digital data over conventional electrical power lines and in particular to hardware and software to provide a low bit-error rate, high speed signal in real time digital transmission and reception on a.c. power lines in the presence of repetitive impulse noise.

2. Description of the Prior Art

Carrier-current communication is well know in the prior art. A recent summary of the state of the art, "Intrabuilding Data Transmission Using Power-Line Wiring" appeared in the May 1987 issue of the Hewlett-Packard Journal. It is known that the usable data bandwidth of power lines is higher than what is currently used. The major obstacles are high noise levels, high signal attenuation and impulse noise.

A number of systems have been proposed to enhance data communication over power lines. Japanese laid open application No. 58-77334 discloses an information signal transmitter for the purpose of improving the reliability of information signal transmission by forecasting a period where no noise exists, making use of the periodicity of the noise and transmitting signals during a period in a signal transmission line where no noise of large amplitude is generated. The system detects noise on the power line and through a signal processing circuit generates a pulse signal to represent a period where a large amplitude noise does not exist. The period of a pulse with a constant width representing the tail edge of a process noise signal is taken as the transmission period for an information signal. The system considers both the noise level and the duration of the noise. However, this system uses analog techniques for detection of large amplitude noise and a one-shot timing circuit. The system inherently lacks precision and no mention of data rates is present.

Japanese laid open application No. 57-153844 for a power line carrier wave device proposes an interesting system to avoid the malfunction due to noise by detecting the presence or absence of a signal based on a high frequency noise in a steady state. A high frequency component is superimposed on the power line and detected by the detection circuit. It is then compared with a prestored signal and if the output signal of the detecting circuit is different from the signal stored, an output signal with the presence of a high frequency signal is generated. This signal is used to switch a load on or off. Thus, the load is controlled even if a high frequency noise of the same phase occurs.

The problem to be solved in all such systems is to detect noise on a standard electrical power line, determine if the noise is periodic, and if it is periodic to determine in a predictive manner when it will occur again so that transmission can be blocked during the periods of noise. Hence, the problem is to predict a repeated noise pattern on the power line. For example, in a 60 Hz power line, impulse noise from a light dimmer switch will appear twice every cycle yielding a 120 Hz noise repetition rate. Data transmission cannot occur effectively over a power line during the occurrence of such noise, which is typically 15-30 microseconds or the time of one pulse. However, a 60 Hz pulse lasts for 16,666 microseconds. As a result, the prior systems with imprecise noise detection circuits tend to reduce data transmission rates in the presence of a considerable number of noise pulses in each half cycle or full cycle.

In the case of a.c. lines with a.c. voltages and active light dimmers present on the line, the worst noise impairing signal reception is the impulse noise generated by light switch dimmers. Some existing power line transmission methods do not avoid light dimmer impulses. Due to the received impulse disturbances, data rates must be severely limited, often to 1 kbit/second. One prior art solution proposed is to send pulses whose duration is substantially longer than the noise duration. This results in a relatively slow transmission rate, about 1 kbit/sec. The prior art systems typically avoid jamming noises in the frequency domain by channel hopping to avoid noisy frequency channels.

SUMMARY OF THE INVENTION

The invention is a transceiver system capable of reliable data communication in the presence of a large number of repetitive impulse-noise disturbances.

The invention has three major subsystems, an a.c. line coupling network; a power line modem such as the NE5050 integrated circuit; and a microprocessor with memory and an avoidance algorithm. The line coupling network includes circuits for detecting and timing impulse noise and providing input signals to the microprocessor. The line coupling network has minimal ringing and good line-transient protection. The NE5050 integrated circuit functions close to the theoretical limit of data density for a given carrier frequency. This limit requires a minimum of one carrier cycle per bit (also called the Nyquist limit).

The avoidance algorithm is a microprocessor program that repetitively scans two or more full intervals of 1/60 sec. (360° a.c. line cycles between zero crossings), that counts the microseconds (timing) at which each impulse occurs (starts/stops), identifies the periodicity of noise repetition and blocks transmission and reception for 15 to 30 microseconds at the occurrence of each light dimmer or other noise impulse found to be repetitive. This enables the NE5050 modem to transmit and receive data between the repetitive noise impulses.

A large number of active light dimmers can be accommodated because each light dimmer impulse translates into 30 microseconds of blank. The same impulse occurs every 1/60 sec. or 1/50 sec. These pulses are repetitive, therefore can be avoided by a precise determination of the per-pulse timing and the pulse repetition rate. This transceiver does in the time domain what is usually done in the frequency domain, jamming avoidance. Instead of performing channel hopping and avoiding the "noisy" frequency channels, the modem avoids the "noisy" time intervals and performs time hopping.

Data communication over the 120-277V a.c. power line is generally limited to below 1 kbit/sec. due to impulse noise generated by light dimmers. The present invention makes it possible to overcome this bit-rate limitation, with low bit-error rates at data speeds from 30 kbit/sec. to 100 kbit/sec. in the presence of impulses from a large number of active light dimmers.

DESCRIPTION OF THE PREFERRED EMBODIMENT

Figure 1A:
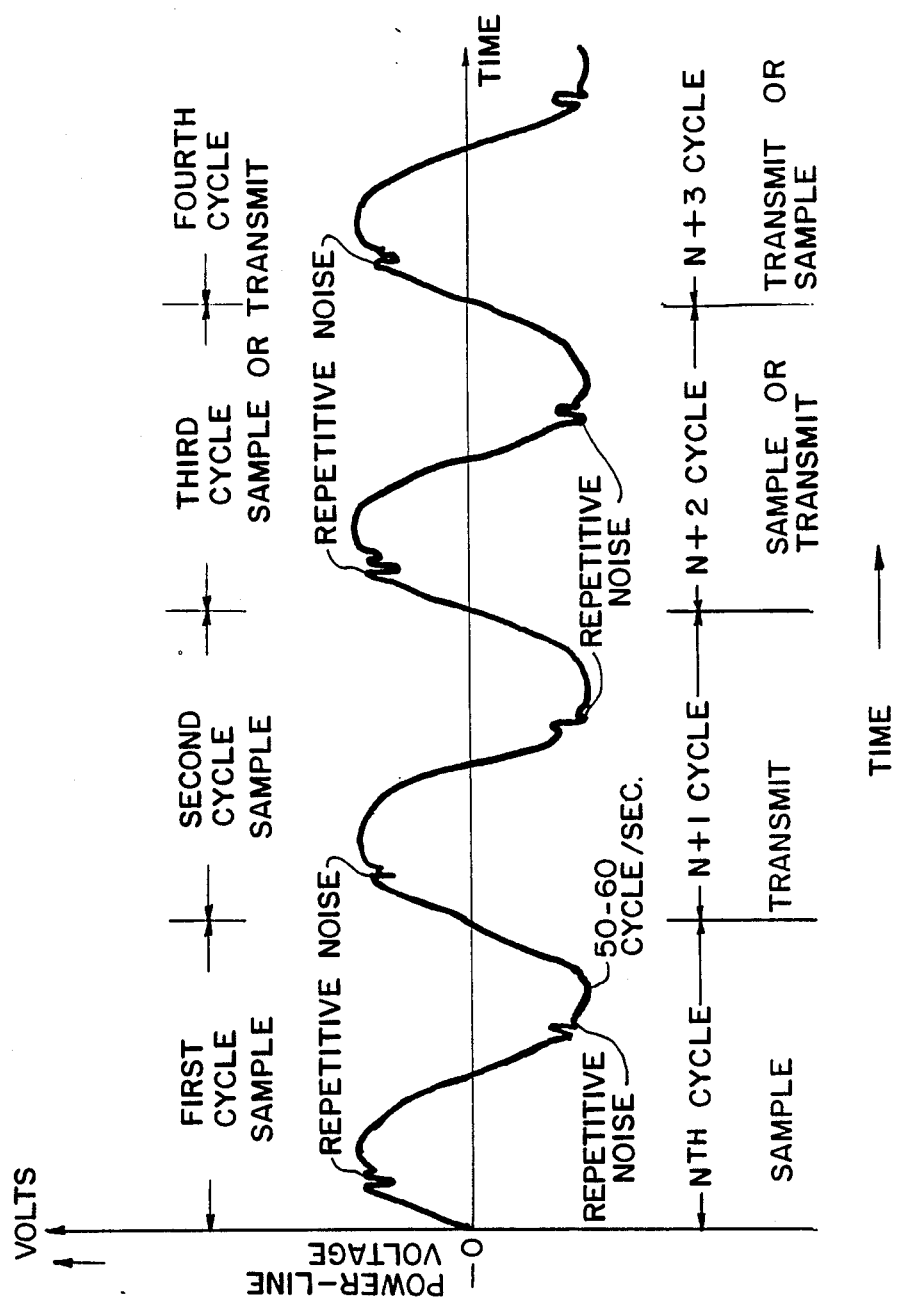
FIGS. 1A, 1B, and 1C are signal waveform and timing diagrams for 60 cycle a.c. line voltage illustrating the sampling technique used in the present invention for the detection and timing of impulse noises.

The present invention is a transceiver system capable of reliable data communication in the presence of a large number of repetitive impulse noise disturbances. In the transmission of information (data or control signals) over a standard electrical power line operating at 50 or 60 cycles, devices such as light dimmers connected to the line cause noise to occur at regular intervals on the power line signal. In the case of a.c. power lines with a.c. voltages and dimmers connected to the power lines, the worst noise impairing the reception of data signals is the impulse noise generated by the dimmers. Due to the normal way of operating dimmers, the dimmers stay in set positions most of the time. This means that they trigger the impulses at set voltages, a repetitive process. The only variation is when the light intensity is set or reset. There are two impulses per dimmer in each a.c. line cycle, as shown in FIG. 1A. Each impulse noise is of very short duration, typically less than one percent of each cycle, but highly troublesome.

The 1% figure is calculated as follows: for 1 kbit/sec. transmission systems the ringing produced by a dimmer impulse is assumed to last about 150 microseconds. One a.c. line cycle lasts 1/60 sec. = 16,666 microseconds. Therefore $150/16,666 = 0.009 < 0.01 = 1\%$. The prior art 1 kbit systems transmit data during the presence of impulses. The present invention reduces the ringing to 30 microseconds with a transient-voltage, limiting, front end.

Figure 1B:
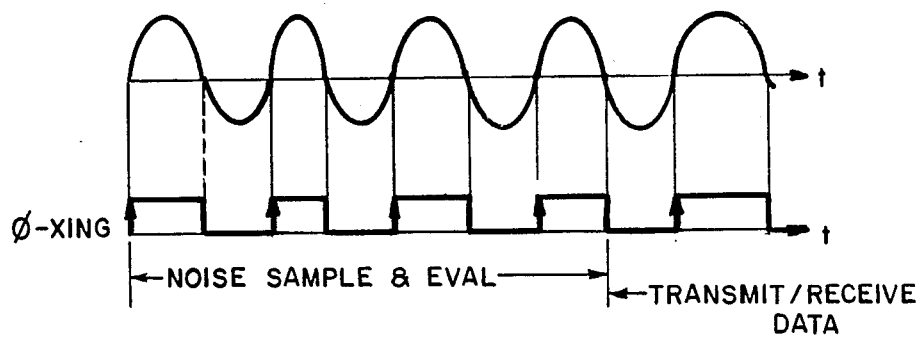
Figure 1C:
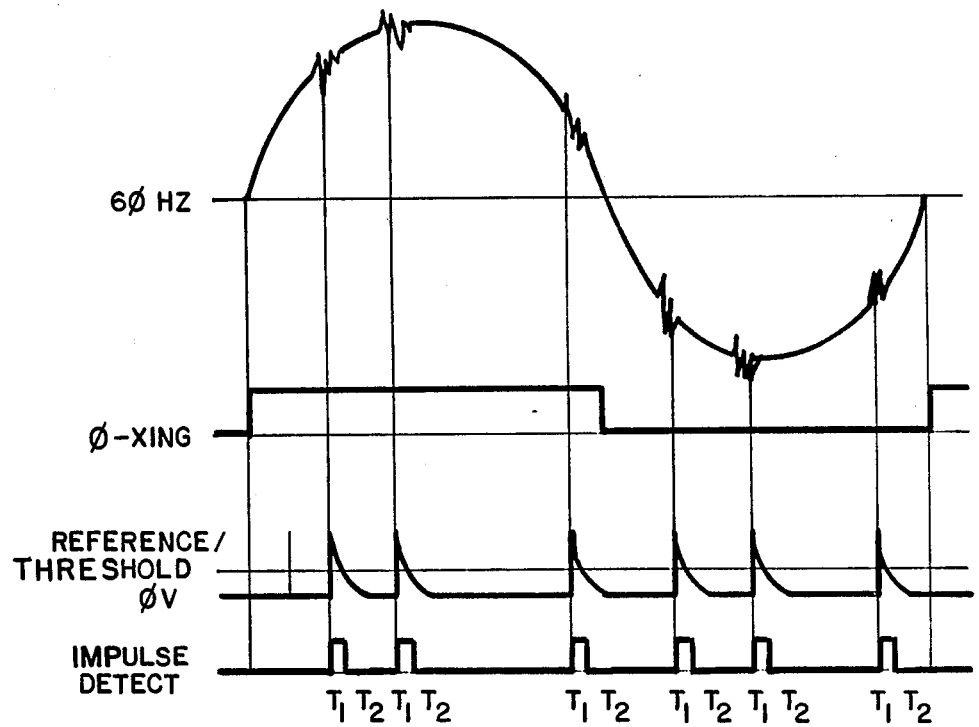

The invention takes advantage of the fact that this impulse noise is repetitive, that is, that the impulse noise occurs at substantially a fixed point during each half-cycle (or cycle), to transmit information when the noise is not present. In particular, the power line signal is sampled during one or more cycles to determine the location of the noise. Information is then transmitted during the next cycle (or next few cycles) during the time periods which, according to the sampling, should be noise free. This procedure is then repeated continuously during future cycles, as shown in FIGS. 1A, 1B and 1C. Alternatively, the sampling and transmission procedures can be run in parallel, at the same time, with two systems, one microprocessor permanently monitoring the line noise in a frequency band, while the second microprocessor manages the data transmission and protocol in the same or a different frequency band.

FIG. 1A illustrates an embodiment in which sampling and transmission may be alternated every other cycle after at least two sample cycles. In this embodiment, a transmission rate of 10-20 kbits/sec. is readily achievable with the present invention. The bit error rate is low because the impulse timing remains the same most of the time, since the dimmers are set and are not adjusted on a continuous basis.

The invention has three major subsystems, (1) an a.c. line coupling network; (2) a power line communications modem having a transmitter section and a receiver section; and (3) a microprocessor with a memory and program that repetitively scans several intervals of 1/60 sec. (a.c. line cycles between zero crossings); that counts the microseconds after a zero crossing at which each impulse occurs (the timing); that finds coincidences in memory (pulses that are repetitive); and that blocks transmission and reception for 15 to 30 microseconds at the occurrence of each light dimmer impulse. This system enables the transceiver a transmit and receive data between the repetitive noise impulses.

Figure 2:
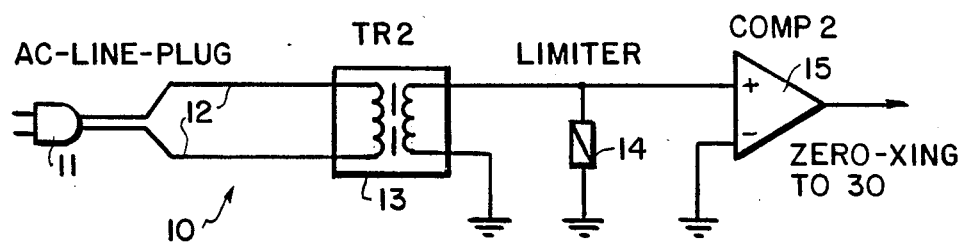
FIG. 2 is the zero-crossing reset circuit used in the present invention.

FIG. 2 is a block diagram of the zero-crossing ($\emptyset$-XING) reset circuit 10 used in the a.c. line coupling network of the present invention. The purpose of this circuit is to define the sampling periods during which the timing of the impulses will be measured. This is usually several full a.c. cycles. In this circuit the a.c. voltage is fed via a plug 11 and wires 12 to a step-down transformer 13 (TR2) where it is stepped down to TTL level. The output of the secondary of the transformer is fed to a current limiter 14, which is two opposed diodes. A comparator 15 (COMP1) shapes this output to TTL logic levels, by comparing it to ground. Repetition is detected by determining the moment when a positive zero to one (0 to b) transition occurs at the zero-crossing (ZERO-XING) output of this circuit. The zero-to-one crossing occurs once every cycle as seen in FIGS. 1A, 1B and 1C.

Figure 3:
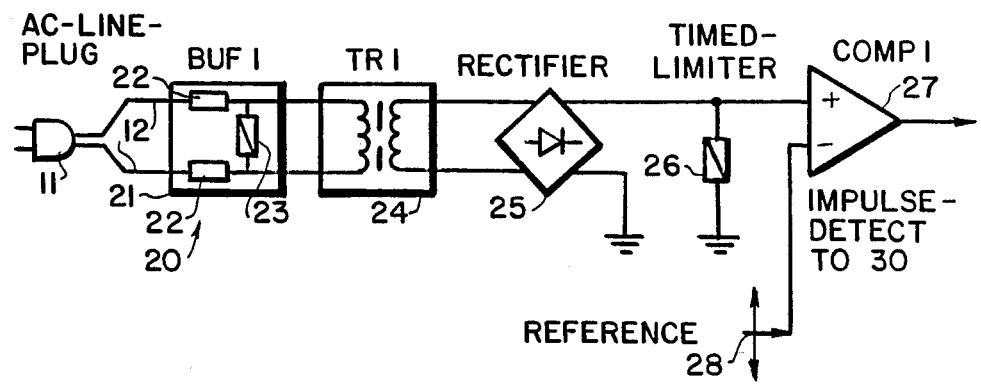
FIG. 3 is the impulse noise detection circuit used in the present invention.

FIG. 3 is a block diagram of the impulse noise detector circuit 20 used in the present invention. The purpose of this circuit is to determine during several sampling periods the timing of the impulses; that is, to establish the periodicity of the noise impulses. When an impulse is on the line, there is ringing that blocks carrier transmission or reception. Circuit 20, which provides a transient-voltage, limiting, front end to minimize ringing, is coupled to the a.c. power line by one or more buffers 21 (BUF1) and a transformer 24 (TR1). The buffer 21 comprises two parallel sets of series C, L, R coupling components 22, each set having optional transient protection (two opposed zener diodes 23 or transzorb). The last sets are connected in series with the primary of transformer 24. The buffer 21 provides transient protection and carrier filtering. Several buffers 21 may be connected in series for high voltage transient protection. It should be noted that impulse protection is done in-band or out-of-band. The transformer 24 is for high frequency coupling and for low frequency rejection (high voltage attenuation). The output of the secondary of transformer 24 goes to a rectifier 25 which rectifies full wave the impulse noise. A timed limiter 26 of two opposed diodes limits the rectified voltage and causes a preset decay of this voltage. A comparator 27 (COMP1) shapes the output signal to TTL and has an adjustable reference voltage 28 to adjust impulse detection above the background noise, or above a preprogrammed threshold level (reference). See FIG. 1C. If strong repetitive impulse noise is absent, that is, if no regular repetition pattern is detected by the microprocessor (FIGS. 5, 6), the transmission can resume at the highest data rate.

Figure 4:
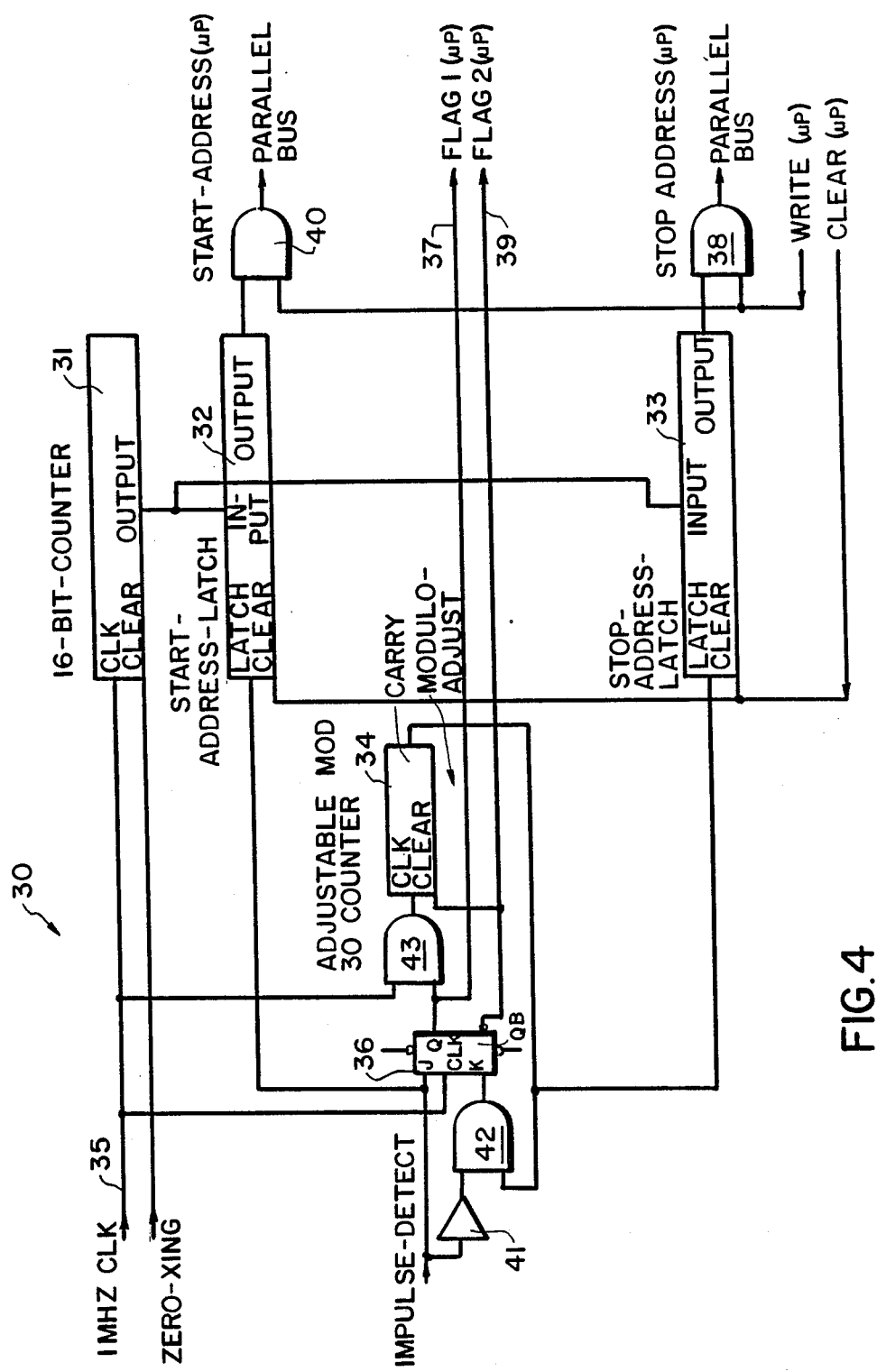
FIG. 4 is the impulse timing circuit used in the present invention.
Figure 5:
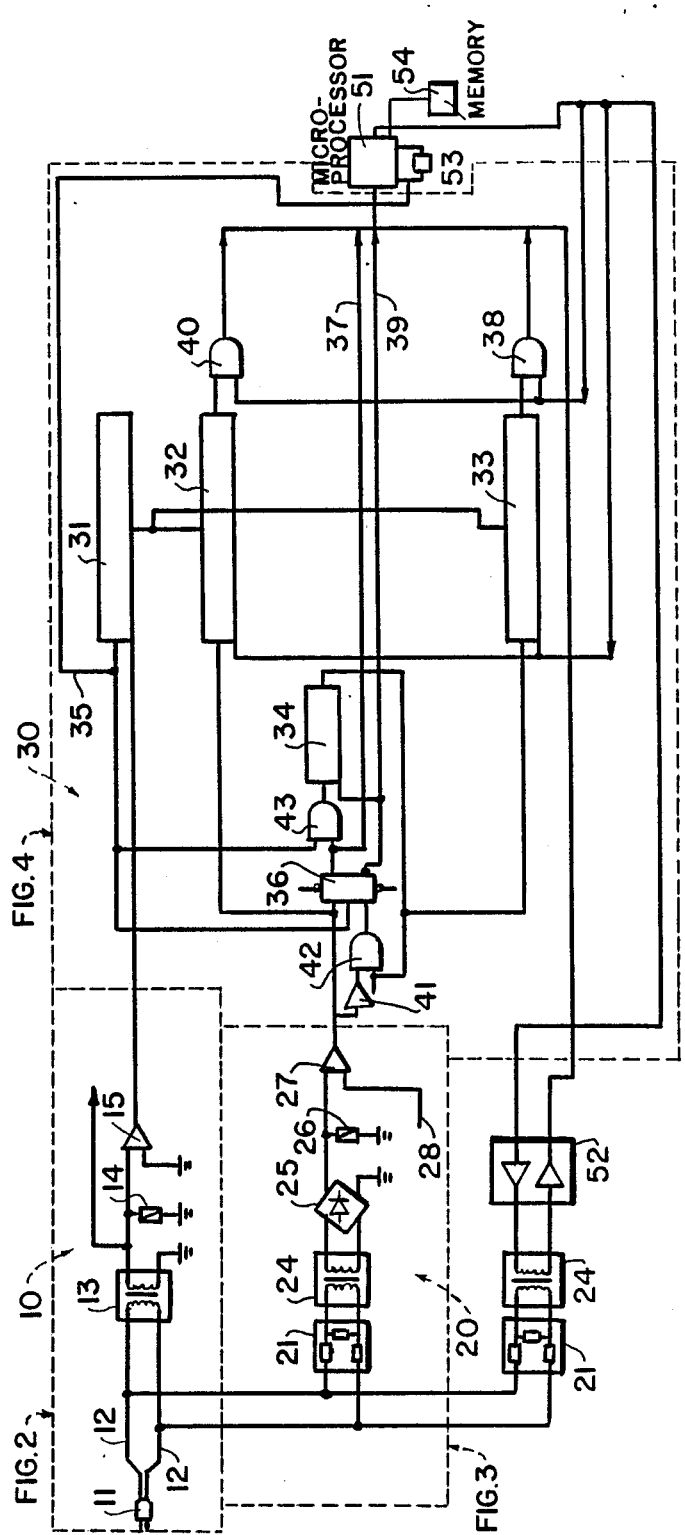
FIG. 5 is a block diagram of the transceiver of the present invention.

FIG. 4 is a block diagram of the impulse timing circuit 30 of the present invention. This circuit has as inputs the outputs of the zero-crossing circuit 10 (FIG. 2)

and the outputs of the impulse detection circuit 20 (FIG. 3). A clock signal is provided on line 35. The impulse timing circuit 30 provides a digital measurement, (executed at a clock rate of 1 MHz to 3.9 MHz), of the absolute timing of the ONs and OFFs of impulse noise. This clock rate can be derived by digital division from the microprocessor clock 53 (FIG. 5). For instance, if the microprocessor 51 runs at 16 MHz, a divide-by-8 generates the 2 MHz clock necessary for impulse timing. A sixteen-bit counter 31 for counting clock cycles is cleared and reset at alternate zero crossing (ZERO-XING) of 60 Hz (every 1/60 sec.). The clock rate for this 16-bit counter can range from 1 MHz (1 $\mu$sec accuracy) to 3.9 MHz (0.25 $\mu$sec accuracy and 16-bit counter full after 16,666 $\mu$sec: $FFFF_{HEX}$). No overflow should occur in the 16-bit counter 31. Therefore the upper frequency is limited to FFFF counts in 16,667 $\mu$sec.

In the preferred embodiment, at the start of the sampling cycles, a first zero-crossing starts the counter 31. Then for each impulse noise subsequent thereto, the start time $T_1$ of the impulse, that is, the count in the sixteen-bit counter at $T_1$, is stored in start address latch 32 on a fast rise, impulse detect, positive edge signal. During the sampling cycle, when impulses are detected, a flip-flop 36 is set, the $T_1$ count in the sixteen-bit counter is latched in the (impulse) start latch 32 and a flag 37 (FLAG1) is set in the microprocessor 51 (FIG. 5) for an interrupt to read the latched count and write it into the microprocessor memory 54 (FIG. 5). The write enable signal is sent through gate 40. When the writing is completed, start latch 32 is cleared. The stop time $T_2$ is stored in stop address latch 33 on the slow-decay impulse-detect, negative-edge signal. $T_2$ can be adjusted by the microprocessor 51 (FIG. 5) for noise evaluation. Two controls are available: an analog threshold or reference voltage 28 (FIG. 3 and FIG. 1C) and/or a digital divider with variable modulo 34 (30 $\mu$sec adjustable, modulo-30 timer). The modulo-30 counter 34 counts the elapsed time of 30 $\mu$sec and the microprocessor 51 adjusts the modulo of this counter to the real, on-site, impulse ringing and to the clock rate. If the timing clock is 2 MHz, the modulo will be 60 to time a 30 $\mu$sec ringing.

An inverter 41 generates a logic 1 when impulse noises are absent, in particular at the end of the impulse ringing. The first AND gate 42 following the inverter 41 generates a logic 1 at the coincidence of two events: the impulse has ended and a 30 $\mu$sec count was performed (carry/overflow=1). The flip-flop 36 is reset (QB=1) and a flag 39 (FLAG2) for an interrupt is set in the microprocessor. If two impulses are close together in time they will be detected as a single impulse of double duration. If the impulse persists beyond 30 $\mu$sec, QB=0 at the end of the first 30 $\mu$sec count or carry. An additional 30 $\mu$sec are counted, the stop-address latch 33 occurs at the first carry and at the second carry, but no interrupt flag is set at the first carry since QB=0. At the second carry QB=1 and the interrupt FLAG2 39 is set for $T_2$ to be read by the microprocessor 51. A write enable signal is sent from microprocesor 51 through gate 38 to write time $T_2$ in its memory 54.

The second AND gate 43 in front of the MOD30-counter 34 clock input passes clock pulses only if an impulse is present, only if Q=1, for proper 30 $\mu$sec timing.

The last two AND gates in FIG. 4, the start-address 40 and the stop-address 38, are groups of parallel AND gates for address transfer to the microprocessor 51. Depending on the microprocessor type used gates 38, 40 may be unnecessary. These AND gates are enabled by the WRITE (in memory) signal from microprocessor 51.

A CLEAR signal clears the latches 32, 33. The latches are cleared by the microprocessor 51 after reading; $T_1$ and $T_2$ are stored in its memory; and the next incoming impulse is timed. The process continues until the next zero crossing is detected. A second zero-crossing signifies the end of one sampling cycle and prevents further recording of impulse times for that cycle in the sixteen-bit counter 31. After a programmable number of sampled 60 Hz cycles, the microprocessor 51 identifies the repetition pattern. Next, for a programmable time, data communication is performed. Optionally these activities, sampling and communication, can be done in parallel for high data rates and uninterrupted noise repetition monitoring.

FIG. 5 is a block diagram of the transceiver system of the present invention, incorporating the circuits 10, 20, 30 of FIGS. 2, 3 and 4. To complete the transceiver, a microprocessor 51 with memory 54 is added. The interrupt inputs come from the flags 37, 39 in the circuit 30 of FIG. 4, and the read lines come from the start and stop latches 32, 33 in the impulse timing circuit 30 of FIG. 4. The two principal inputs to the microprocessor are data and impulse timing. A power line modem 52 receive (RX) and transmit (TX) lines are added to the previous circuits. The principal output of the microprocessor is a signal to the modem 52 to stop/start transmitting.

The impulse timing circuit 30 (FIG. 4) enables the microprocessor 51 to make a digital measurement of the absolute timing of the ON-OFF of each impulse noise detected in the sampling cycles of the impulse noise detection circuit 20 of FIG. 3. Each start/stop timing is stored in the microprocessor memory 54. Thus, the microprocessor 51 creates a mapping of the impulse noise. Since the microprocessor 51 can sample frequently, the mapping can be updated frequently and its nearly instant accuracy influences favorably the bit-error rate. In a multinode network, the maps are transmitted at low speed to all stations, before data is sent at high speed according to the mapping, and according to the positive answer from the network nodes involved.

For the modem 52 of FIG. 5, a power line modem such as the Signetics NE5050 (Signetics Corporation, Sunnyvale, Calif.) may be utilized for discrete frequency transmission. The NE5050 includes a receiver, a transmitter and circuitry to overcome power line impulse noise and line impedance modulation. The NE5050 modem 52 is connected to the power line by an a.c. line coupling network 21, 24 similar to that coupling the impulse noise detection circuit 20 of FIG. 3. Alternatively, the NE5050 modem may be replaced with a spread-spectrum modem having similar time hopping capability.

Figure 6:
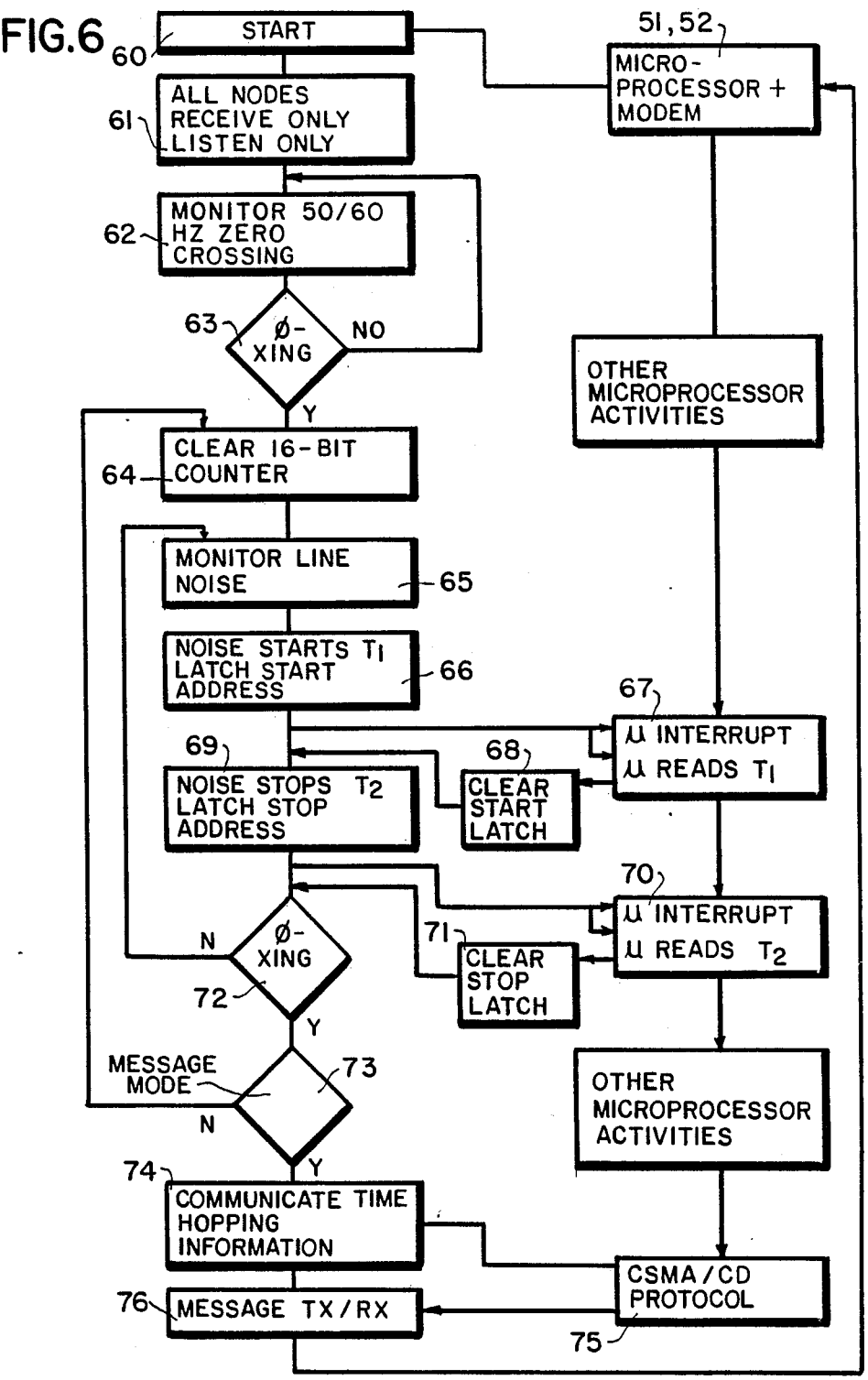
FIG. 6 is a flow chart of the operation of the transceiver system of the present invention.

FIG. 6 is a flow chart of the operation of the transceiver of the present invention. Since very little time is used in microprocessor operations, that device 51 is shown to the right of the chart. At the start 60 of system operation, all nodes of a data communication network are in a receive state 61 and the microprocessor 51 is on.

Initially, at power up the system operates only in the sampling mode for a predetermined number of cycles. Also, within any one area network there is usually only one master station. However, where portions of a building are on separate power lines or in an interbuilding network with each building on a separate power line network, there could be more than one master node in the data communication network. Time hopping information can be exchanged between network nodes located cross-phase.

The zero-crossing circuit 10 in FIG. 2 continuously monitors zero-crossings 62. When a zero-crossing is detected 63, and when the system is in a sampling mode, this event triggers the clearing and restart 64 of sixteen-bit counter 31. At this point the circuit 20 of FIG. 3 is activated and this circuit monitors line noise 65. The sixteen-bit counter 31 simply counts the cycles of a 1 MHz clock (in the preferred embodiment). The first indication of a noise causes the count in sixteen-bit counter to be latched at time $T_1$ 66 and triggers an interrupt 67 to the microprocessor 51. The microprocessor reads the count 67 in the latch and writes this count as the start address of an impulse noise. It then clears 68 the start address lath 32 so that the latch is available for a subsequent impulse start. As the noise stops at time $T_2$ 69 the noise level decays below an adjustable threshold (reference) 28, the stop time $T_2$ on the sixteen-bit counter 31 is latched 69 into the stop latch 33 and an interrupt signal 70 is sent to the microprocessor 51. The microprocessor 51 reads the stop latch 33, records its count, and clears 71 the stop latch 33. At this point the start and stop times of the first impulse in a sample cycle have been recorded. The system then returns to a monitoring state until either another impulse is detected or a zero-crossing is detected 72. If an impulse is detected first, steps 65 through 71 are repeated. If a zero-crossing is detected 72, the sample cycle is terminated and the system decides whether to sample for another cycle or to go into the message mode 73. If it samples for another cycle, steps 64 through 73 are repeated. If it goes into a message mode 73, the microprocessor 51 communicates time hopping information 74 to all the network nodes, that is the start stop times of periodic impulse noise for each full a.c. cycle. The modem 52 does not transmit between these times. The microprocessor 51 also controls the modem 52 with protocol procedure 75. The modem 51 is then free to transmit or receive data 76 during available times outside the blocked impulse noise periods.

A large number of active light dimmers can be thus accommodated, since each light dimmer impulse translates into 30 microseconds of blank. The same impulse occurs every 1/60 sec. or 1/50 sec. (Europe, Asia). These pulses are repetitive and can be avoided by a precise determination of the per-pulse timing (30 μsec) and the pulse repetition rate. This transceiver does in the time domain what is usually done in the frequency domain, jamming avoidance. Instead of performing channel hopping and avoiding the "noisy" frequency channels, the transceiver avoids the "noisy" time intervals and performs time hopping.

The present invention has low bit-error rates at data speeds from 30 kbit/sec. to 100 kbit/sec. in the presence of impulses from a large number of active light dimmers. The approximate mathematical relation between the maximum data rate and the number of active dimmers is (worst case assumed, when no impulses coincide):

maximum data rate $= F*(1/F - 2*N*T_D)/T_{BIT}$ where:
maximum data rate = [bit/sec]
F = a.c. line frequency [Hz] (50, 60, 400, etc.)
N total number of light dimmers in use
$T_D$ = single-impulse maximum disturbance period [sec]
$T_{BIT}$ = minimum time duration of a bit [sec]

In the following cases $T_{BIT} = 20$ μsec is used for example, not as a minimum, and 1 μsec $= 10^{-6}$ sec.

CASE 1. If the a.c. line frequency is 60 Hz one can have about 275 active dimmers, assuming that no impulses are superimposed in time (worst case):
F = 60 Hz
1/F = 16,666 μsec
N = number of active light dimmers
$T_D = 30$ μsec = maximum experimental observed disturbance (maximum time with no received carrier)
$T_{BIT} = 20$ μsec = bit width = the bit length in time
If N = 0, then the max. data rate = 60*(16,666 − 2*0*30)/20 = 50 kbit/sec.
If N = 10, then the max. data rate = 60*(16,666 − 2*10*30)/20 = 48 kbit/sec.
If N = 100, then the max. data rate = 60*(16,666 − 2*100*30)/20 = kbit/sec.
If N = 200, then the max. data rate = 60*(16,666 − 2*200*30)/20 = 14 kbit/sec.
If N = 272, then the max. data rate = 60*(16,666 − 2*272*30)/20 = 1 kbit/sec.
If N = 278, then the max. data rate = 60*(16,666 − 2*278*30)/20 = 0 bit/sec.

CASE 2. If the a.c. line frequency is 50 Hz one can have about 333 active dimmers, assuming that no impulses are superimposed in time (worst case):
F = 50 Hz
1/F = 20,000 μsec
N = number of active light dimmers
$T_D = 30$ μsec = maximum disturbance (maximum time with no received carrier)
$T_{BIT} = 20$ μsec = bit width = the bit length in time
If N = 0, then the max. data rate = 50*(20,000 − 2*0*30)/20 = 50 kbit/sec.
If N = 10, then the max. data rate = 50*(20,000 − 2*10*30)/20 = 48 kbit/sec.
If N = 100, then the max. data rate = 50*(20,000 − 2*100*30)/20 = 35 kbit/sec.
If N = 200, then the max. data rate = 50*(20,000 − 2*200*30)/20 = 20 kbit/sec.
If N = 300, then the max. data rate = 50*(20,000 − 2*300*30)/20 = 5 kbit/sec.

In either CASE 1 or CASE 2 the discrete RF carrier frequency or the spread-spectrum bandwidth is independent of the data rate in the sense of having complete freedom of choice for the discrete RF frequency or spread-spectrum bandwidth at which data communication can occur (it occurs in the broadband). The limit imposed upon the RF carrier frequency or the spread-spectrum bandwidth are as follows:

Minimum frequency: there should be at least one carrier cycle that is transmitted and represents the shortest bit width. For instance if 20 μsec is the minimum bit width in a particular system then the lowest frequency for the system cannot be less than $1/(20*10^{-6} \text{ sec}) = 50$ kHz. This limit is also called the Nyquist limit and is theoretical.

Maximum frequency: there is no upper limit except for the FCC/EMI regulations for radiated/conducted RF interference and the practical considerents such as increased line losses at higher RF frequencies.

We claim:

1. A transceiver system for high speed digital, low bit-error rate digital communication on an a.c. power line in a repetitive noise environment comprising:
- a microprocessor having a memory and a system clock;
- zero-crossing means coupled to an a.c. power line to detect the beginning and end of each cycle of alternating current;
- counter means connected to said zero crossing means and to said system clock wherein said counter means is activated by said zero crossing means at the start of an a.c. cycle and deactivated by said zero crossing means at the end of an a.c. cycle and wherein said counter means counts cycles of said system clock during each a.c. cycle;
- impulse detection means coupled to said a.c. power line to detect impulse noise having an amplitude greater than a present threshold;
- means to latch the count in said counter means at the start of a detected impulse noise;
- means to latch the count in said counter means at the end of said detected impulse noise;
- means to interrupt said microprocessor and write said latched counts in its memory;
- means in said microprocessor to compare recorded impulse times in one a.c. cycle with recorded times in a second a.c. cycle, to determine periodicity of impulse noises in a plurality of said a.c. cycles, thereby predicting the times at which said periodic impulse noises will occur in subsequent a.c. cycles;
- a modem having transmit and receive sections connected to said microprocessor and couples to said a.c. power line;
- control means in said microprocesor to block said modem from transmitting or receiving during the predicted times of said impulse noises in each subsequent a.c. cycle.

2. The transceiver of claim 1 wherein said means to couple said transceiver to an a.c. power line comprises a transient-voltage, limiting, front end to minimize the ringing of each impulse and to minimize the time during which communication is blocked.

3. The transceiver system of claim 1 wherein said system further comprises:
- a sampling mode; and
- a communication mode.

4. A transceiver system for high speed digital data communication over an a.c. power line comprising:
- an a.c. line coupling network;
- an a.c. power line communications modem coupled to said a.c. power line;
- a microprocesor having inputs from said a.c. line coupling network and controlling said modem by its outputs;
- said line coupling network comprising:
- means to determine the start/end of each cycle of said a.c. power line by detecting zero-crossings;
- means to detect the occurrence of impulse noise(s) during a cycle interval;
- means to count the time after a zero crossing at which each impulse noise occurs in an interval;
- means to latch said count;
- said microprocessor comprising:
- means to read and store said latched count(s) for said interval;
- means to determine repetitive patterns of impulse noise times in a plurality of cycles; and
- means to block communication by said modem during times in each a.c. cycle when repetitive impulses occur.

5. The transceiver system of claim 4 wherein said a.c. coupling network comprises:
- a zero-crossing reset circuit to determine the start and end of each a.c. cycle, providing an interval for timing for periodic impulse noises;
- an impulse detection circuit to detect impulse noise, to cause a preset decay of its voltage and to shape its signal;
- an impulse timing circuit to provide a digital measurement of the time each impulse detected in said detection circuit occurs with respect to each a.c. cycle interval of said zero detection circuit.

6. The transceiver system of claim 5 wherein said zero-crossing reset circuit comprises:
- a two-wire connection to an a.c. power line to provide an a.c. voltage;
- a step-down transformer receiving the a.c. voltage from said connection on its primary winding and outputting a TTL voltage from its secondary winding;
- a current limiter having two opposed diodes receiving said TTL voltage; and
- a comparator to shape said limited current to TTL logic levels such that a zero-crossing is detected at the positive zero-to-one transition at the output of said comparator.

7. The transceiver system of claim 5 wherein said impulse detection circuit comprises:
- a two-wire connection to said a.c. power line to provide an a.c. voltage;
- at least one buffer circuit having two parallel sets of series C, L, R coupling components receiving said a.c. voltage to provide transient protection and carrier filtering;
- a transformer having its primary winding connected in series to said C, L, R, coupling components, to provide high frequency coupling and low frequency rejection;
- a rectifier which receives the output of the secondary of said transformer to rectify full wave a detected impulse noise;
- a timed limiter having two opposed diodes to limit the rectified voltage and cause a preset decay of said rectified voltage; and
- a comparator to shape said limited rectified voltage and adjust impulse detection above a reference voltage.

8. The transceiver of claim 5 wherein said impulse timing circuit comprises:
- means to receive a zero-crossing signal indicating the start of a timing interval comprising one a.c. cycle;
- means to receive a signal indicating the presence of a detected impulse on said a.c. power line;
- means to receive a signal indicating the absence of an impulse on said a.c. power line;
- means to adjust a signal indicating the absence of noise to eliminate background noise;
- means to provide a clock signal at a present frequency;
- a counter to count clock cycles which is cleared and initialed by a first zero-crossing signal;
- means to latch the count in said counter when a signal indicating a detected impulse appears;
- means to latch the count in said counter when a signal indicating the absence of a pulse is first detected;

means to clear and reset said counter upon detection of a second zero-crossing signal.

9. The transceiver system of claim 8 wherein said means to adjust comprises an analog threshold voltage against which the impulse voltage is compared.

10. The transceiver system of claim 8 wherein said means to adjust comprises a digital divider with a variable modulo, and means to adjust said modulo to actual impulse noise timing.

11. The transceiver of claim 10 wherein said means to receive a signal indicating the absence of noise comprises:
   an inverter fed by a signal below a threshold voltage, generating a logic 1;
   an AND gate which generates a logic 1 when said inverter provides a logic 1 and when said variable modulo has counted out;
   a flip flop which is reset by a logic 1 from said AND gate; and
   an interrupt flag generated by said flip flop.

* * * * *